United States Patent [19]

Piccolo et al.

[11] 4,292,085

[45] Sep. 29, 1981

[54] METHOD FOR CONVERTING INTO A NON-POLLUTING PARTICULATE PRODUCT THE FERROUS SULPHATE OBTAINED IN THE PRODUCTION OF TITANIUM DIOXIDE BY THE SULPHATE PROCESS

[75] Inventors: Luigi Piccolo, Milan; Tullio Corsini, Sesto Calende; Antonio Paolinelli; Gaudenzio Ferri, both of Milan; Angelo La Rovere, Seveso, all of Italy

[73] Assignee: Euteco Impianti S.p.A., Milan, Italy

[21] Appl. No.: 75,446

[22] Filed: Sep. 14, 1979

[30] Foreign Application Priority Data

Sep. 14, 1978 [IT] Italy .................... 27661 A/78

[51] Int. Cl.³ .................. C04B 11/00; C04B 7/34; C01F 11/46; C01G 41/14
[52] U.S. Cl. .................. 106/109; 423/555; 423/558; 423/DIG. 2; 106/118; 106/900
[58] Field of Search .............. 423/DIG. 2, 555, 558; 106/109, 110, 118, 900

[56] References Cited

U.S. PATENT DOCUMENTS

| | | | |
|---|---|---|---|
| 2,165,344 | 7/1939 | Colton | 106/109 |
| 2,184,271 | 12/1939 | Colton | 106/109 |
| 2,240,254 | 4/1941 | Colton | 106/109 |
| 2,316,039 | 4/1963 | Wilson | 106/109 |
| 4,118,243 | 10/1978 | Sandesara | 106/109 |

FOREIGN PATENT DOCUMENTS

| | | | |
|---|---|---|---|
| 2021 | of 1858 | United Kingdom | 106/109 |
| 1001490 | 8/1965 | United Kingdom | 423/558 |

*Primary Examiner*—Gary P. Straub
*Attorney, Agent, or Firm*—Sughrue, Mion, Zinn, Macpeak and Seas

[57] ABSTRACT

Ferrous sulphate heptahydrate obtained as a by-product of the production of titanium dioxide by the sulphate process is converted into a non-polluting, free-flowing particulate neutralization product by contacting said sulphate with calcium hydroxide as a neutralizing agent in a molar ratio between said neutralizing agent and said ferrous sulphate of at least 1:1, and reacting the resulting mixture under agitation at a temperature not exceeding 60° C. and for a contact time not exceeding five minutes.

16 Claims, No Drawings

4,292,085

METHOD FOR CONVERTING INTO A NON-POLLUTING PARTICULATE PRODUCT THE FERROUS SULPHATE OBTAINED IN THE PRODUCTION OF TITANIUM DIOXIDE BY THE SULPHATE PROCESS

BACKGROUND OF THE INVENTION

1. Field of the Invention

The invention relates to a treatment to convert ferrous sulphate heptahydrate, which is a by-product of the production of titanium dioxide by the sulphate process, into a non-polluting particulate product.

2. Description of the Prior Art

As is known, the production of titanium dioxide by the sulphate process essentially involves the following operations:

(a) attack of the ilmenitic material with sulphuric acid and formation of a solution of iron and titanium sulphates;

(b) reduction of the iron to the ferrous state and its partial precipitation in the form of ferrous sulphate heptahydrate;

(c) hydrolysis of the resulting titaniferous solution and precipitation of the hydrated oxide of titanium;

(d) treatment of this hydrated oxide until titanium dioxide is obtained in the form of anatase or rutile;

(e) possible recovery of the sulphuric acid from the residual solution after hydrolysis.

The ferrous sulphate heptahydrate which is separated in stage (b) is in fact a mixture of several components of which a typical composition by weight is: $FeSO_4.7H_2O=88\%$, $MgSO_4.7H_2O=6\%$, $TiOSO_4=0.3\%$, $Al_2(SO_4)_3.18H_2O=0.3\%$, $MnSO_4.5H_2O=0.2\%$, $(VO)_2SO_4=0.005\%$, free sulphuric acid 1.0%, water 4.0%, as well as several ppm of sulphates of zirconium, hafnium and rear earths. A product similar to that already described separates in stage (e) of the sulphate process, in that in this stage the residual solution from hydrolysis is treated, for example by cooling, to induce the separation of the residual iron sulphate.

Hence, in the description that follows, by ferrous sulphate heptahydrate, or more simply ferrous sulphate, will be meant those by-products, having a composition equal to or similar to that given above, which result from stage (b) and/or stage (e) in the production of titanium dioxide by the sulphate process.

The polluting characteristics of ferrous sulphate are such that they do not allow its direct disposal, neither into the sea nor into pits or the like. In fact in the first case the reducing properties of the ferrous salt, the phenomena of hydrolysis of the salt and other phenomena, induce serious damage to marine flora and fauna. In the second case considered, the leaching effect of water, especially rain water, results in pollution of the underlying water-bearing layers.

Moreover, in the process for the production of titanium dioxide about five parts by weight of ferrous sulphate are formed for every part by weight of titanium dioxide and account must be taken of the fact that modern installations have an annual output, with reference to titanium dioxide, of the order of tens of thousands of tons.

As a result the problem of disposing of very large quantities of a highly polluting product exists.

The conversion of the ferrous sulphate into products which are insoluble in water and non-hydrolysable by the latter, even if this appears to be an obvious solution at least at first sight, has not until now brought any satisfactory results in view of the numerous difficulties which are encountered in a treatment of this type. It is, in fact, difficult to ensure:

complete conversion or substantially complete conversion of the ferrous sulphate;

in industrially-acceptable times the maintenance in the reaction mass of those free-flowing characteristics which are indispensable to a correct conduction of the reaction.

With regard to the first condition it is evident that incomplete neutralization does not allow the elimination of the pollution characteristics of the ferrous sulphate. The free-flowing of the reaction mass constitutes, on the other hand, a condition necessary for the carrying out of the reaction in the solid phase, it being taken into account that the use of an aqueous carrier would increase the mass in play to an intolerable extent and would bring with it additional costs for the separation of the carrier at the end of the reaction. Finally, short reaction periods also constitute a determining element of whether or not the process is economical.

SUMMARY OF THE INVENTION

The present invention is based, on the one hand, on the choice of a precise neutralizing agent capable of converting the ferrous sulphate into insoluble substances and, on the other hand on the operating conditions which allow the neutralization reaction to be brought to completion, or substantial completion, while operating with extremely brief times, with a free-flowing solid mass and while producing a neutralized product free from polluting characteristics.

The invention provides a process for converting into a non-polluting, free-flowing particulate neutralization product the ferrous sulphate heptahydrate obtained as a by-product of the production of titanium dioxide by the sulphate process, characterized by bringing into contact said ferrous sulphate heptahydrate with calcium hydroxide as a neutralizing agent in apparatus suitable for mixing powders, using a molar ratio between said neutralizing agent and said ferrous sulphate of at least 1:1, reacting the resulting mixture under agitation at a temperature not exceeding 60° C. and for a contact time not exceeding five minutes, and discharging the resulting neutralization product from said apparatus.

DETAILED DESCRIPTION OF THE INVENTION

In the preferred embodiment the treatment is carried out by a continuous operation, still within the range of times and temperatures given above.

By operating in the manner described as well as conditions of free-running of the mass under treatment, conversions of at least 97% and typically from 98.5 to 100% with respect to the iron are ensured in the neutralized product. In the case of incomplete neutralization it is sufficient to maintain the mass for a brief period of time under ambient conditions, after discharge from the mixer, to obtain complete conversion of the iron, without bringing about agglomeration of the particles.

In particular, by operating according to the process of the present invention, a free-flowing neutralized product is obtained which may go from a fine powder in which at least 80% of the particles have a size of from 0.05 to 1 mm, up to grains of a size greater than 1 and up to about 4 mm, depending on the pre-chosen conditions for the neutralization.

With regard to the reagents, the ferrous sulphate is in the form of a solid which crumbles readily and may be fed to the mixture as it is, while the neutralising agent is generally fed in the form of a powder with an average particle size generally less than 44 microns.

As already stated, the neutralizing agent suitable for the purposes of the present invention is calcium hydroxide. The choice of this agent is critical in that other basic compounds, such as oxides and carbonates, do not allow a satisfactory degree of neutralization and/or induce agglomeration in the reagent mass. It is generally preferable to use a slight molar excess of neutralizing agent with respect to the ferrous sulphate. The upper limits of said molar excess are not particularly critical and are mainly dictated by economical reasons. Conveniently, a molar excess not exceeding 25% is used, as no appreciable advantages are obtained with higher values. In the preferred embodiment, a 5 to 15% molar excess of the neutralizing agent is used with respect to the ferrous sulphate. It should be noted that in practice the number of moles of ferrous sulphate are evaluated on the basis of the weight of the composition in which they are contained, this weight being divided by the molecular weight for $FeSO_4.7H_2O$.

Finally, it should be noted that the ratio between the neutralizing agent and the ferrous sulphate influences, to a certain degree, the grain size of the neutralized product, in the sense that, other conditions being equal, this grain size is lower for higher values of the said ratio.

A further critical aspect of the process of the present invention consists in the contact time between the ferrous sulphate and the neutralizing agent which must not exceed 5 minutes in order not to induce the formation of agglomerates, or of compact masses in the reaction mass. The minimum time for this contact is not critical but is dictated essentially by the need to ensure complete or substantially complete neutralization of the ferrous sulphate and hence depends, to a certain extent, on the mixing capacity of the apparatus used. It has been ascertained, however, that it is generally not convenient to fall to values less than 0.5 minutes, the optimum values being of the order of 1 to 2 minutes. The contact time has a noticeable effect on the grain size of the neutralized product, in the sense that, other conditions being equal, the grain size is higher with longer contact times.

During the neutralization the temperature of 60° C., preferably 50° C., must not be exceeding in order to induce phenomena of agglomeration of the reagent mass. The lower limits of the reaction temperature are not critical, but it is not convenient to fall below ambient temperatures. The preferred temperatures are from ambient temperatures (20° to 25° C.) up to about 50° C. The temperature also influences the grain size of the neutralized product in the sense that, other conditions being equal, the lower grain size is obtained in the lower range of temperatures.

There is a further factor which influences the course of the neutralization, namely the quantity of water present in the reaction medium. It is not water present in the form of water of crystallization that is under discussion but free water already present in the reagents and/or fed together with the reagents. It has in fact been found that a quantity of free water up to about 10 to 12% by weight of the reagent mixture is suitable for imparting a grain size of the order of 1 to about 4 mm on the neutralized product without inducing the undesirable phenomena of agglomeration of the mass. In practice it is found that a quantity of free water of the order of 8 to 9% by weight allows a neutralized product to be obtained in the form of granules having the said size and optimal free-flowing characteristics.

Therefore, by regulating the parameters such as contact time, temperature, ratio between the reagents and, above all, the content of free water, it is possible to direct the reaction towards the formation of a neutralized product having the desired grain size. In practice the reaction is directed towards the formation of the lesser grain size in the case of a neutralized product intended for the production of soil conditioners or modifiers, while the higher grain sizes are preferred if the neutralized product is destined to be discharged for example into a pit.

The apparatus suitable for the neutralization are mixers generally consisting of a cylindrical casing having internal elements suitable for mixing powders. The preferred mixers are those having a double-system of agitation with, in addition, means for cleaning the internal surface of the casing. These mixers are conveniently provided with a heat-exchange system for the purpose of controlling the thermal effects of the neutralization reaction.

In every case, by operating according to the present invention, a free-flowing neutralized product is obtained, completely free from polluting effects as will be evident from the experimental examples which follow. In particular, in these examples, there is used a steel reactor (mixer) with a volume of 130 liters, in the form of a cylinder with its axis horizontal, provided with an inlet opening for the reagents and an outlet opening for the discharge of the reaction product (neutralized product). This mixer is provided with a double-system of agitation and, more particularly, on the horizontal shaft are fixed a plurality of arms carrying at their other ends plough-shaped scraping blades with serrated edges. In the central position is placed an agitator provided with a series of helixes adapted to create a high turbulence in the mass. The temperature is controlled by means of circulation of water in an external jacket. The mixer is fed in a continuous manner with the ferrous sulphate (having the composition given above) in the form of agglomerates which break up into granules of a size less than 1 mm and the neutralizing agent in the form of a powder, 90% of which has a grain size less than 44 microns, in a predetermined ratio. Operation is with contact times and with temperatures which will be further defined below, the mass being maintained under efficient agitation, and the neutralized product, which is subjected to characterisation, being discharged continuously.

EXAMPLES 1-11

In the examples 1 to 11, carried out according to the invention, calcium hydroxide is used as the neutralizing agent, operation is without the external addition of free water and the influence of temperature, contact time and the ratio between the reagents on the course of the neutralization reaction is shown. The results are given in Table 1. In this table there are given:

the value of the excess calcium hydroxide (as a molar percentage) with respect to the ferrous sulphate, the number of moles of the latter having been calculated in the manner indicated above, the value of the contact time in minutes, the value of the neutralization temperature in degrees C., the molar percentage value of the iron converted into insoluble compounds determined on the basis of the soluble iron residue, the appearance of the neutralized product.

It should be noted, in particular, that in no case did the formation of agglomerates or lumps occur and that by the wording: "powder" is meant a grain size for 80% of the product of from 0.05 to 1 mm, "slightly granular" is meant grain sizes for 80% of the product of between 0.250 and 1.5 mm and "fine granules" is meant grain sizes for 80% of the product of between 0.5 and 2 mm.

With regard to the conversion of the iron, this is evaluated immediately at the outlet from the reactor and, in the case of incomplete conversion, the completion was achieved outside the mixer, under ambient conditions in a maximum time of the order of 1 to 2 hours.

TABLE 1

| Example | Molar excess (%) $Ca(OH)_2$ | Contact time (min.) | Temperature °C. | Conversion Fe (%) | Appearance of neutralized product |
|---|---|---|---|---|---|
| 1 | 20 | 1 | 36 | 99.9 | powder |
| 2 | 15 | 1 | 36 | 99.1 | powder |
| 3 | 10 | 1 | 36 | 98.8 | powder |
| 4 | 20 | 2 | 36 | 100 | slightly granular |
| 5 | 15 | 2 | 36 | 99.8 | slightly granular |
| 6 | 10 | 2 | 36 | 99.5 | slightly granular |
| 7 | 10 | 2 | 49 | 99.6 | fine granules |
| 8 | 15 | 2 | 49 | 99.8 | fine granules |
| 9 | 20 | 2 | 49 | 100 | fine granules |
| 10 | 25 | 2 | 49 | 100 | fine granules |
| 11 | 30 | 2 | 49 | 100 | fine granules |

EXAMPLES 12–14 (control)

Example 5 was repeated, the contact time being raised to 6, 9 and 12 minutes respectively and the results are given in Table 2.

EXAMPLES 15–16 (control)

Example 5 was repeated at a temperature of 70° and 90° C. respectively. The results are recorded in Table 2

TABLE 2

| Example | Molar excess (%) $Ca(OH)_2$ | Contact time (min.) | Temperature °C. | Conversion Fe (%) | Appearance of neutralized product |
|---|---|---|---|---|---|
| 12 | 15 | 6 | 36 | 95.5 | agglomerated |
| 13 | 15 | 9 | 36 | 92.4 | highly agglomerated |
| 14 | 15 | 12 | 36 | 95.1 | compact mass |
| 15 | 15 | 2 | 70 | 87.2 | agglomerated |
| 16 | 15 | 2 | 90 | 81.3 | agglomerated |

EXAMPLES 16–18

The run of Example 2 is faithfully repeated and the distribution of the grain sizes of the neutralized product is determined (Example 16). Example 2 was then repeated, the mass being sprayed with water in quantities of 5% by weight (Example 17) and 7% by weight (Example 18) with respect to the reagent mass. The grain size of the neutralized product was determined and the results are given in Table 3.

EXAMPLE 19 (control)

Example 2 was repeated, the water being sprayed in quantities of 10% by weight with respect to the reagent mass. The results are again given in Table 3. In evaluating these results it is necessary to take into account the fact that the initial ferrous sulphate already contains 4% by weight of free water.

TABLE 3

| Grain size of the neutralized product (% by weight) | Example | | | |
|---|---|---|---|---|
| | 16 | 17 | 18 | 19 |
| >2 mm | 9.74 | 6.04 | 79.8 | Agglomerated product |
| >1 mm | 8.68 | 68.86 | 18.3 | |
| >0.5 mm | 5.72 | 4.17 | 1.2 | |
| >0.25 mm | 15.89 | 7.9 | 0.2 | |
| >0.172 mm | 25.85 | 2.14 | 0.2 | |
| ≦0.172 mm | 34.1 | 0.82 | 0.3 | |

EXAMPLE 20

The neutralized product obtained in Example No. 4 was subjected to a leaching test with water, four hours after discharge from the mixer. In practice this test is carried out in the following manner. Samples of 500 grams of the neutralized product are suspended in 1000 ml of water at ambient temperature (20° to 25° C.), and maintained in suspension by agitation of the mass by blowing in of air for 2.5 and 20 hours respectively. At the end of the leaching time, the product is filtered through a Buchner funnel under vacuum, Whatmann 42 filter paper being used. The value of the pH and of the C.O.D. of the filtrate are determined. The determination of the oxygen demand is carried out in accordance with the ASTM-D 1252/67 method.

The filter cake is then washed with 500 ml of water and the filtrate and the washing water are combined. The resulting solution is then evaporated under vacuum until a residual solution of 200 ml is obtained. During this evaporation the formation of turbidity was noted which was eliminated by the addition of aqueous hydrochloric acid. The resulting solution was subjected to analysis, the results of which are given in Table 4. In this table the numerical values are given in parts per million (ppm) of the original sample (neutralized product) subjected to analysis.

It should be noted, moreover, that the pH value of the filtered solution as such was 9.4 with 2.5 hours of leaching and 10.0 with 20 hours of leaching. In the two cases the COD value, expressed as ppm of oxygen, was 28 and 35 respectively.

EXAMPLES 21–30 (control)

The run of Example 1 was repeated, using calcium carbonate as the neutralizing agent. A free-flowing reaction product was obtained in each case. The operative conditions and the results are given in Table 5.

EXAMPLES 31–40 (control)

The run of Example 1 was repeated, using a mixture of calcium oxide and calcium carbonate (5:95 by weight) as the neutralizing agent.

The operative conditions and results are given in Table 6.

EXAMPLES 41–48 (control)

The run of Example 1 was repeated, using a mixture of calcium oxide and calcium carbonate (10:90% by weight) as the neutralizing agent. The operative conditions and the results are given in Table 7.

EXAMPLES 49–52 (control)

The run of Example 1 was repeated, using calcium oxide as the neutralizing agent. The operative conditions and the results are given in Table 8.

TABLE 4

|  | Leaching 2.5 hours | Leaching 20 hours |
|---|---|---|
| $SO_4$ ppm | 3.684 | 3.136 |
| $PO_4$ ppm | 0.08 | 0.08 |
| $Cr^{VI}$ ppm | absent | absent |
| Cr total ppm | 0.0186 | 0.0186 |
| Al ppm | 0.190 | 0.270 |
| Fe ppm | 0.400 | 0.408 |
| Mn ppm | 0.022 | 0.016 |
| Pb ppm | 0.122 | 0.122 |
| Cu ppm | <0.1 | <0.1 |
| Zn ppm | 0.108 | 0.108 |
| Si ppm | 2.8 | 4.64 |
| Ti ppm | <0.4 | <0.4 |
| V ppm | <0.1 | <0.1 |
| Ca | 380 | 360 |
| Na | 16 | 16 |

TABLE 5

| Example | Molar excess (%) $CaCO_3$ | Contact time (hours) | Temperature (°C.) | Conversion Fe (%) |
|---|---|---|---|---|
| 21 | 10 | 3 | 60 | 76 |
| 22 | 10 | 3 | 90 | 78.9 |
| 23 | 10 | 4 | 60 | 79 |
| 24 | 10 | 5 | 60 | 90.8 |
| 25 | 10 | 6 | 60 | 96.7 |
| 26 | 20 | 2 | 60 | 54 |
| 27 | 20 | 3 | 60 | 64 |
| 28 | 20 | 3 | 90 | 75.3 |
| 29 | 20 | 4 | 60 | 86.4 |
| 30 | 20 | 5 | 60 | 99 |

TABLE 6

| Example | Molar excess (%) $CaO$—$CaCO_3$ | Contact time (hours) | Temperature (°C.) | Conversion Fe (%) |
|---|---|---|---|---|
| 31 | 10 | 0.15 | 20 | 29 |
| 32 | 10 | 0.15 | 60 | 29 |
| 33 | 10 | 1 | 20 | 33 |
| 34 | 10 | 1 | 60 | 33 |
| 35 | 10 | 2 | 20 | 54 |
| 36 | 10 | 2 | 60 | 54 |
| 37 | 20 | 3 | 20 | 77 |
| 38 | 20 | 3 | 60 | 77 |
| 39 | 20 | 4 | 20 | 81 |
| 40 | 20 | 4 | 60 | 81 |

TABLE 7

| Example | Molar excess (%) $CaO$—$CaCO_3$ | Contact time (hours) | Temperature (°C.) | Conversion Fe (%) |
|---|---|---|---|---|
| 41 | 20 | 0.15 | 20 | 34 |
| 42 | 20 | 0.15 | 60 | 34 |
| 43 | 20 | 1 | 20 | 50 |
| 44 | 20 | 1 | 60 | 50 |
| 45 | 20 | 2 | 20 | 61 |
| 46 | 20 | 2 | 60 | 61 |
| 47 | 20 | 3 | 20 | 86 |
| 48 | 20 | 3 | 60 | 86 |

TABLE 8

|  | Examples | | | |
|---|---|---|---|---|
|  | 49 | 50 | 51 | 52 |
| Molar excess CaO (%) | 20 | 20 | 10 | 20 |
| Contact time (min) | 1 | 2 | 2 | 5 |
| Temperature (°C.) | 68 | 71 | 69 | 73 |
| Fe Conversion (%): | | | | |
| At the outlet (zero time) | — | — | 19.5 | — |
| After 4 hours | 41.9 | 43.8 | — | 67.2 |
| After 48 hours | — | 87.0 | 80 | 87.2 |
| After 120 hours | — | 100 | — | — |
| Appearance of neutralized product | Pasty mass after 20 min. of maturing | Pasty mass after 30 min. of maturing Compact mass after 48 hrs of maturing | Compact mass after 48 hrs of maturing | Compact mass after 48 hrs of maturing |

We claim:

1. A process for converting into a non-polluting, free-flowing particulate neutralization product the ferrous sulphate heptahydrate obtained as a by-product of the production of titanium dioxide by the sulphate process, which comprises combining a reaction mixture by bringing said ferrous sulphate heptahydrate into contact with calcium hydroxide as a neutralizing agent in an apparatus suitable for mixing powders, in the presence of free water in an amount not exceeding 12% by weight with respect to the reaction mixture using a molar ratio between said neutralizing agent and said ferrous sulphate of at least 1:1, reacting the resulting mixture under agitation at a temperature not exceeding 60° C. and for a mixing time not exceeding five minutes, and discharging the resulting neutralization product from said apparatus, said neutralization product being a free-flowing particulate.

2. The process of claim 1, wherein said neutralizing agent is in the form of a powder with an average particle size less than 44 microns.

3. The process of claim 1, wherein the neutralizing agent is used in a molar excess not greater than 25% with respect to said ferrous sulphate.

4. The process of claim 1, wherein the neutralizing agent is used in a molar excess of from 5 to 15% with respect to said ferrous sulphate.

5. The process of claim 1, wherein said contact time is from 0.5 to 5 minutes.

6. The process of claim 1, wherein said contact time is of the order of 1 to 2 minutes.

7. The process of claim 1, wherein said temperature is from 20° to 60° C.

8. The process of claim 1, wherein said temperature does not exceed 50° C.

9. The process of claim 1, wherein said amount of free water is of the order of 8 to 9% by weight.

10. The process of claim 1, which is carried out continuously.

11. The process of claim 1, wherein the ferrous sulphate conversion is at least 97%.

12. The process of claim 1, wherein the ferrous sulphate conversion is from 98.5 to 100%.

13. The process of claim 1 wherein said neutralizing agent is a powder having an average particle size less than 44 microns, the contact time is about 0.5 to 5 minutes, the reaction temperature is about 20° to 60° C., the amount of free water present during said reaction does not exceed 12% by weight and the amount of the neutralizing agent does not exceed the amount of ferrous sulphate by 25% on a molar basis.

14. The process of claim 1 wherein said neutralizing agent is a powder having an average particle size less than about 44 microns, the contact time is about 1 to 2 minutes, the reaction temperature is less than 50° C., the amount of free water present during the reaction does not exceed 12% by weight and the amount of the neutralizing agent does not exceed the amount of ferrous sulphate by 25% on a molar basis.

15. The process of claim 1 wherein the free-flowing particulate is comprised of at least 80% particles having a size of from 0.05 mm to 4 mm.

16. A process as in claim 1 wherein substantially 0% free water is contained within said reaction mixture.

* * * * *